United States Patent [19]
Silverbrook

[11] Patent Number: 6,008,868
[45] Date of Patent: *Dec. 28, 1999

[54] LUMINANCE WEIGHTED DISCRETE LEVEL DISPLAY

[75] Inventor: Kia Silverbrook, Leichhardt, Australia

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/402,505

[22] Filed: Mar. 13, 1995

[30] Foreign Application Priority Data

Mar. 11, 1994 [AU] Australia ................... PM4409

[51] Int. Cl.⁶ .................. H04N 3/14; G09G 5/10
[52] U.S. Cl. .................. 348/790; 348/803; 345/88; 345/149; 345/150; 345/152
[58] Field of Search .................. 345/32, 84, 90, 345/103, 149, 151, 152, 88, 150; 348/790, 791, 803; 359/54, 61, 68, 87; 349/3, 108, 145, 146; H04N 3/14

[56] References Cited

U.S. PATENT DOCUMENTS

| | | | |
|---|---|---|---|
| 4,642,619 | 2/1987 | Togashi | 340/701 |
| 4,837,613 | 6/1989 | Paxton et al. | 345/150 |
| 5,052,785 | 10/1991 | Takimoto et al. | 359/54 |
| 5,124,695 | 6/1992 | Green | 340/784 |
| 5,300,942 | 4/1994 | Dolgoff | 345/32 |
| 5,461,503 | 10/1995 | Deffontainses et al. | 359/68 |
| 5,526,021 | 6/1996 | Naylor, Jr. | 345/149 |

FOREIGN PATENT DOCUMENTS

| | | |
|---|---|---|
| 0322106 | 6/1989 | European Pat. Off. |
| 2133912 | 8/1984 | United Kingdom |

*Primary Examiner*—Michael H. Lee
*Attorney, Agent, or Firm*—Fitzpatrick, Cella, Harper & Scinto

[57] ABSTRACT

The construction of display devices often involves the replication of a single pixel design a large number of times. Full color display devices are often constructed on the principle of utilising multiple primary colors in order to form a final destination color. Previously, the degree of complexity of the pixel arrangement devoted to each primary color was substantially the same. The present invention discloses devoting a variable degree of complexity to each primary color in a pixel layout depending on the perceptual response of the human eye to the particular primary color. For example, there is disclosed a pixel arrangement having red, green and blue primary colors wherein substantial complexity is devoted to the green primary color with a lesser complexity devoted to the blue primary color.

15 Claims, 12 Drawing Sheets

RED

GREEN

BLUE

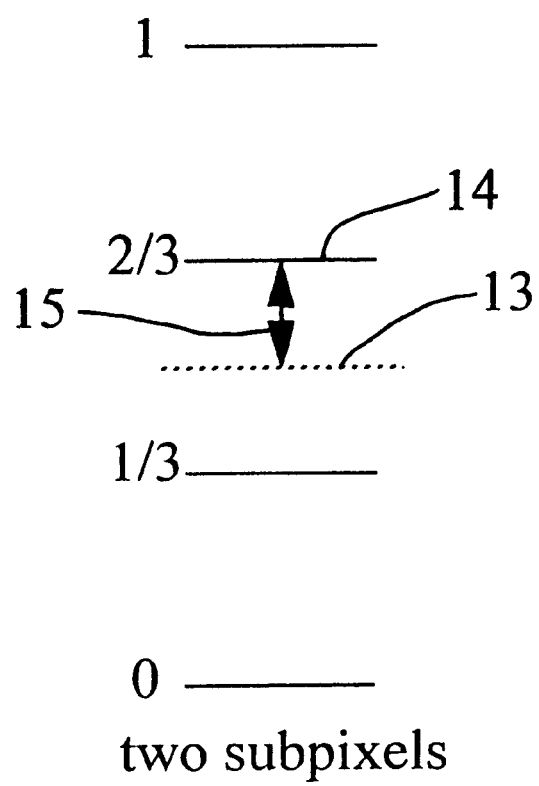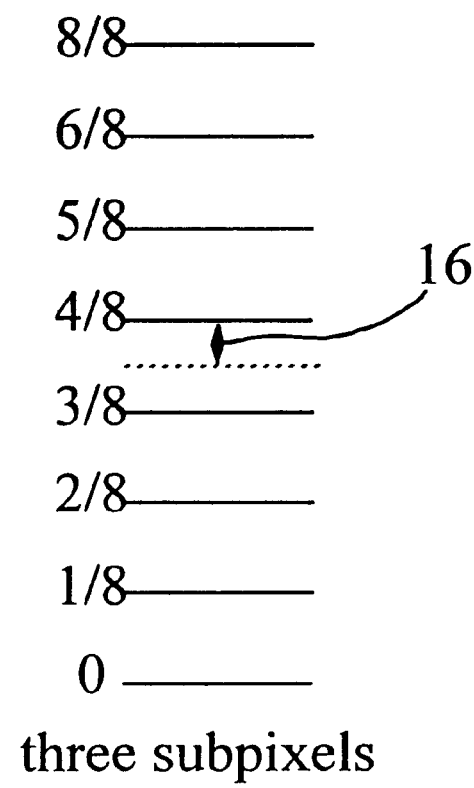
two subpixels
FIG. 6
three subpixels
FIG. 7

LUMINANCE WEIGHTED DISCRETE LEVEL DISPLAY

FIELD OF THE INVENTION

The present invention relates to a color display apparatus such as color computer displays and color printers, and, in particular, to the display of color images on a raster color display apparatus.

BACKGROUND OF THE INVENTION

The background of the invention will now be described with reference to the following drawings in which:

FIG. 1 is a schematic view of a conventional single pixel of a CRT type display.

Referring now to FIG. 1, there is shown a single pixel 1 of a normal Cathode Ray Tube (CRT) type display device. Each pixel is made up of a Red 2, Green 3 and Blue 4 phosphor dot or pixel elements. These dots are so small that when grouped together with a large number of other pixels, the light emanating from the individual dots is perceived by the viewer as a mixture of the corresponding three colors. A wide range of different colors can thus be produced by a pixel element by variation of the strength with which each phosphor dot is excited.

The display of color images in these devices is normally achieved by storing an associated value for each pixel of the display and sending this value to an intensity conversion means with the display at the requisite time. The number of different possible values stored for each pixel element of a pixel corresponds with the number of different colors which may be displayed by the display device and hence the resolution with which the device can display a given picture. With a television signal, a similar procedure is adopted of sending a pixel value to the screen corresponding to a required illumination of each particular pixel. Such procedures are well known by those skilled in the art.

By way of example, a 24 bits per pixel color display system divided into 8 bits for each of the three colors red, green and blue will be assumed. This corresponds to $2^8$ or 256 separate intensity levels of each red, green and blue respectively, giving $2^{24}$ different color values. A color display capable of displaying this many colors can approximate a continuous tone image to such a degree that for all practical purposes the display can be considered to be a continuous tone display.

Colors are often displayed on a computer display according to a particular model. The red, green, blue (RGB) color model is one that is in common use with CRT and color raster display devices. Other color display models include cyan, magenta, yellow (CMY) often used in color-printing devices. An example of the RGB model is the NTSC picture display standard in common use with computer displays.

As the intensity of each phosphor dot can be varied in an analogue manner, the optical center of the illumination from the phosphor dot is the centre of that dot regardless of the light intensity produced. Additionally, when multiple primary pixel elements are used to display a given color, the perceived optical center of the illumination remains substantially in the same place. Effectively, the position of a pixel is at its optical centre of illumination and, as such, all images displayed on a workstation CRT assume that the optical centers of pixel are in a regular rectangular grid.

Many display devices are unable to actually display the full range of color provided by, for example, a 24 bit input pixel. For example, a black and white raster image display can only display 2 colors, namely black and white and is known as a bi-level device. Other color display devices can only display a finite number of discrete intensity levels for each color unit. By way of further example, in a color bi-level device, such as a bilevel ferro-electric liquid crystal display (FLCD), each illumination area on the screen can be at just two intensity levels, either fully on or fully off If the display device receives an input which has been generated on the basis that each pixel is able to display a larger number of intensity levels than can actually be displayed, then there will be an error in the color displayed, being the difference between the exact pixel value required to be displayed and the approximated value actually displayed.

Methods of generating input signals to discrete type displays have been developed to increase the number of apparent colors displayable on an discrete color display device such as a bi-level color display. The methods used are known generally as halftoning. For an explanation of the different aspects of halftoning the reader is referred to a standard textbook such as 'Digital Halftoning' by Robert Ulichney, published in 1991 by MIT Press.

In order to increase the number of possible intensity levels per pixel group methods of utilizing varying size sub-pixels have been developed. For example, U.S. Pat. No. 5,124,695 (Green / Thorn EMI) discloses a pixel pattern arrangement where sub-pixels of varying size are used in relation to monochrome displays. The use of sub-pixels of varying size is also disclosed in European Patent Application 361,981 (Nakagawa et. al. / Sharp).

SUMMARY OF THE INVENTION

It is a general object of the present invention to produce an improved form of color discrete level display in comparison with that disclosed by the prior art.

In accordance with a first aspect of the invention there is provided a method for determining a pixel layout pattern for a display having a plurality of pixels, each said pixel having a plurality of independently illuminable areas, each said area being assigned to one of a plurality of primary color components, said method comprising at least the step of allocating said independently illuminated areas to said primary color components in a ratio such that the condition of the illuminated areas to one color component is different from that of the illuminated areas to the other color component.

In accordance with a second aspect of the invention there is provided a method for determining the number of drive lines allocated to each primary color of a discrete level color display, said display having a plurality of pixels, each said pixel having a plurality of independently illuminable area , each said area being assigned to one of a plurality of primary color components, said method comprising at least the step of allocating said drive lines to said primary color in a ratio such that the condition of the illuminated areas to one color component is different from that of the illuminated areas to the other color component.

In accordance with a third aspect of the invention there is provided a color display apparatus having a plurality of independently illuminable areas each of which is assigned to one of a plurality of primary color components, wherein said independently illuminated areas are allocated to said primary color components in a ratio such that the condition of the illuminated areas to one color component is different from that of the illuminated areas to the other color component.

In accordance with a fourth aspect of the invention there is provided a color display apparatus having a first plurality of independently illuminable areas connected to second plurality of data drive lines, each of said illuminable areas being assigned to one of a plurality of primary color components, wherein said data drive lines are allocated to said primary color components in a ratio such that the condition of the illuminated areas to one color component is different from that of the illuminated areas to the other color component.

The present invention is applicable to many different types of discrete level displays including plasma displays, electro-luminescent displays and ferro-electric displays. The present invention is further applicable to displays having a number of discrete illumination areas with each area being capable of being illuminated to one or more levels.

The preferred embodiment of the present invention will be described in relation to a particular configuration of a FLCD display. In the design of a particular FLCD display in which each pixel is made up of a number of areas which can be independently illuminated, a number of constraints or trade-offs must be enforced. On the one hand, it is desired to maximize the illumination properties of a particular panel while keeping the design of the panel as simple as possible in order to ensure that it can be readily manufactured. Further constraints include a general need to limit the number of opaque drive lines available for driving the areas of a pixel which can be independently illuminated, and the need to faithfully reproduce the desired image with as little distortion as possible.

BRIEF DESCRIPTION OF THE DRAWINGS

A preferred embodiment of the present invention will now be described with reference to the accompanying drawings in which:

FIG. 6 illustrates the discrete threshold error of a primary color of the display as shown in FIG. 4;

FIG. 7 illustrates the discrete threshold error comparison for the primary color of a display having an increased number of drive lines;

DESCRIPTION OF THE PREFERRED EMBODIMENT

In accordance with a first embodiment of the present invention there is provided a method for determining a pixel layout pattern for a display having a plurality of pixels, each pixel having a plurality of independently illuminable areas, each area being assigned to one of a plurality of primary color components, each primary color component having a corresponding human eye response function, said method comprising allocating said independently illuminated areas to said primary color components in a ratio substantially in accordance with the ratio of said corresponding human eye response functions.

In accordance with a second embodiment of the present invention there is provided a method for determining the number of drive lines allocated to each primary color of a discrete level color display, said display having a plurality of pixels, each pixel having a plurality of independently illuminable areas, each area being assigned to one of a plurality of primary color components, each primary color component having a corresponding human eye response function, said method comprising allocating said drive lines to said primary colors in a ratio substantially in accordance with the logarithmic ratio of said corresponding human eye response functions.

In accordance with a third embodiment of the present invention there is provided a color display having a plurality of independently illuminable areas each of which is assigned to one of a plurality of primary color components, each of said primary color components having a corresponding human eye response function, wherein said independently illuminated areas are allocated to said primary color components in a ratio substantially in accordance with the ratio of said corresponding human eye response function.

In accordance with a fourth embodiment of the present invention there is provided a color display having a first plurality of independently illuminable areas connected to second plurality of data drive lines, each of said illuminable areas being assigned to one of a plurality of primary color components, each of said primary color components having a corresponding human eye response function, wherein said data drive lines are allocated to said primary color components in a ratio substantially in accordance with the logarithmic ratio of said corresponding human eye response function.

Figure 1:
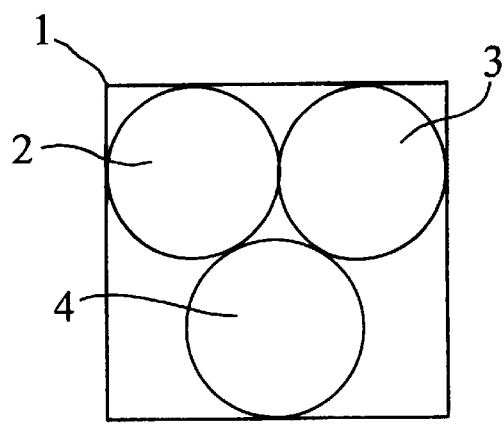
Figure 2:
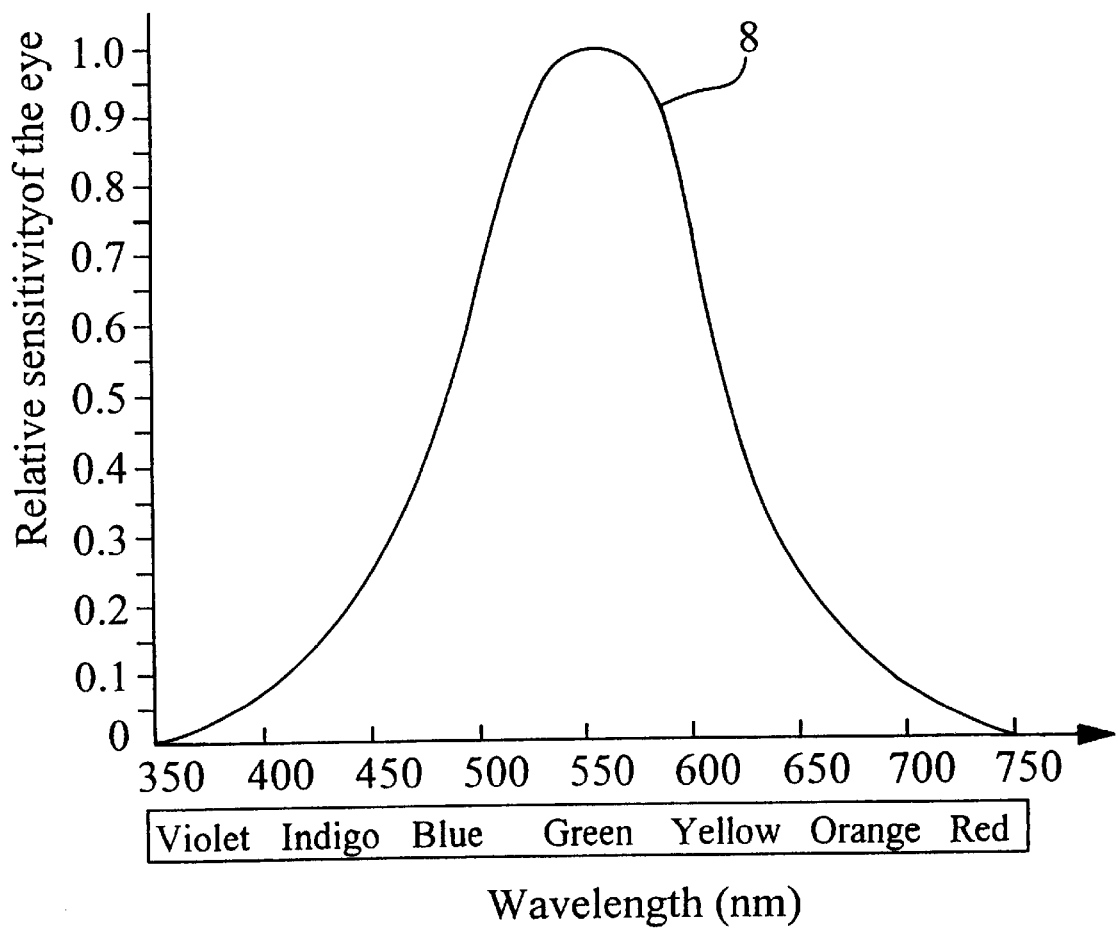
FIG. 2 illustrates a graph of the relative sensitivity of the eye.

The human eye is not uniformly sensitive over the visible spectrum and as such the eye is more sensitive to some displayed colors than to other displayed colors. This can be seen in FIG. 2 which shows the relative average response of the human eye to light of constant luminance projected at various wavelengths throughout the spectrum. The sensitivity curve peaks in the yellow-green region 8 indicating that the eye is a lot more sensitive to yellow-green than any other colors.

Figure 3:
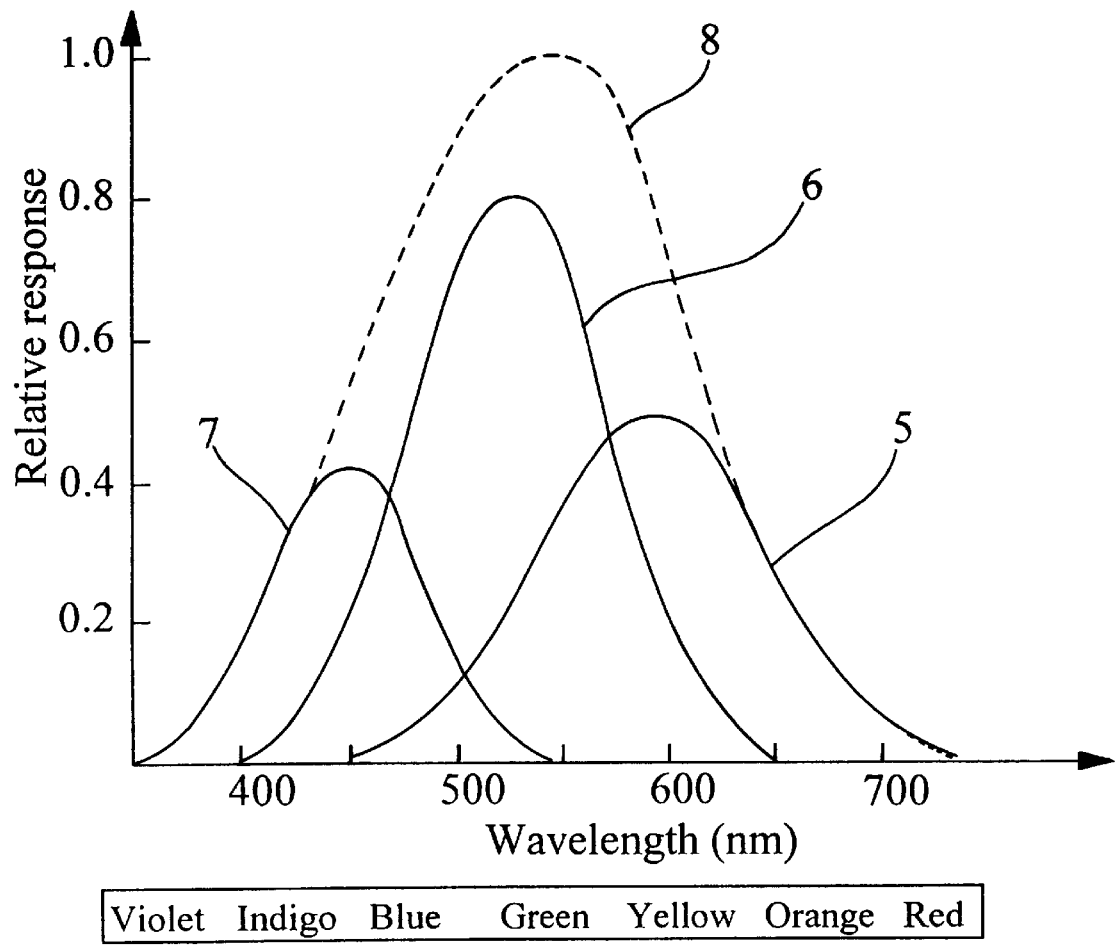
FIG. 3 illustrates a graph of the relative responses of the eye to the red, green and blue primary colors.

Almost all colors required to be created can be achieved by mixing the three primary colors red, green and blue in various proportions. This principle is closely followed by the eye, where there are believed to be only three types of cones or receptors correlating closely to red, green and blue, and each type of cone has a different response curve. Referring now to FIG. 3, the response curves of the relative sensitivities of the eye to the three primary colors, red 5, green 6, and blue 7 are shown as well as the total response curve 8. The curves overlap in such a way that all spectral colors are beneath either only one, or else partly under two of the three curves. As can be seen from FIG. 3, the eye has greater sensitivity to green than to red or blue., and greater sensitivity to red than blue.

Figure 4:
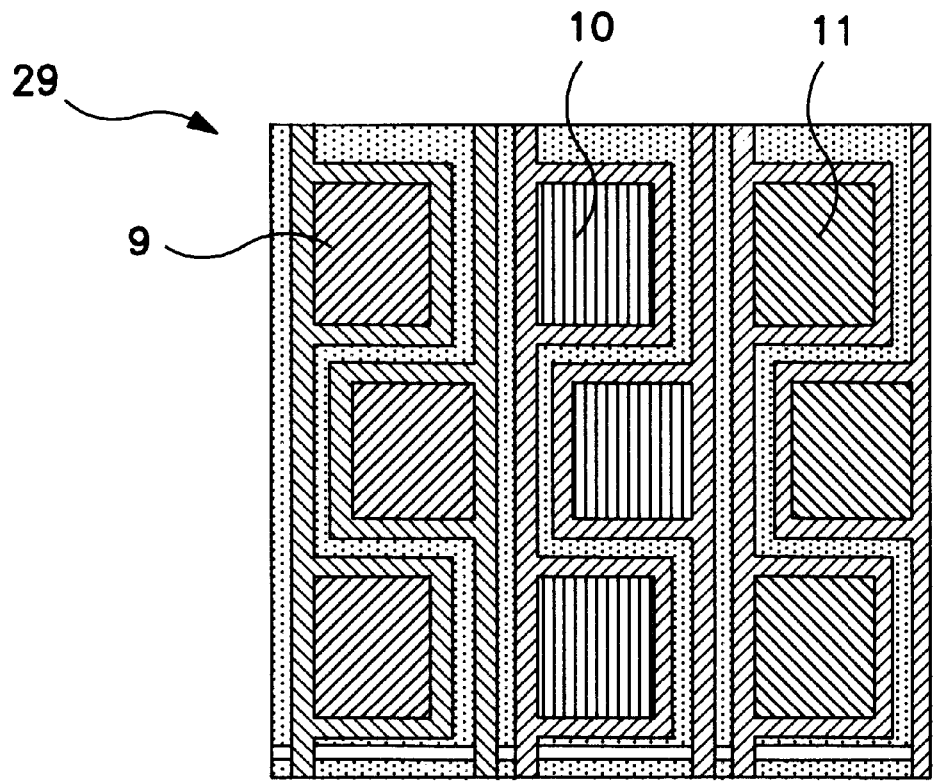
FIG. 4 is a simplified plan view of a pixel arrangement not having the attributes of the present invention.
Figure 5:
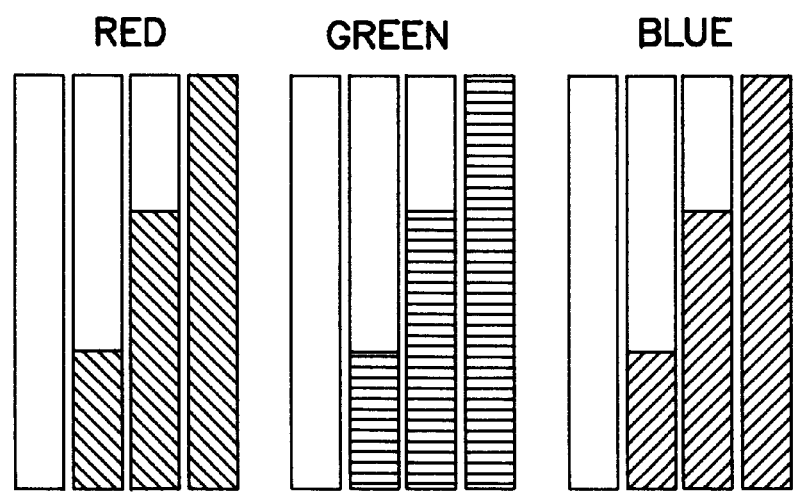
FIG. 5 illustrates the levels of the primary colors of a display such as that shown in FIG. 4.

Referring now to FIG. 4 there is shown a pixel design for an arrangement in a first form of conventional display 29. In this particular arrangement, the number of areas or pixel sub-elements that can be independently illuminated (eg., 9, 10, 11) and the number of drive lines allocated to each of the three primary colors red, green and blue are treated equally in a conventional fashion. Hence there are six sub-elements per pixel and two binary weighted sub-elements are assigned to each primary color thus achieving four possible levels of output for each primary color as shown in FIG. 5. It should be noted that arrangement 29 of FIG. 4, by treating each primary color equally, does not take into account the weighted response of the human eye to each color's illumination.

Referring now to FIG. 6, there is illustrated an example of the error 15 which can be produced when displaying an image on a discrete level display with four possible levels. This error comprises the difference between an arbitrary level 13 which is desired to be displayed and the closest corresponding displayable level 14. Of course, the error 15 increases significantly when there are only a limited number of intensity levels which can be displayed by the pixel.

The number of individual possible displayable levels can be made to increase exponentially with the number of available drive lines. FIG. 7 illustrates the situation where the number of drive lines devoted to each primary color is increased to Three. In this case the number of possible intensity levels will be increased to eight when the illumination of each displayable area of a primary color forms a binary relationship. In this case, the maximum error 16 is substantially reduced.

The preferred embodiment of the present invention minimizes the maximum error as seen by the eye, by applying the weighted response of the eye to the amount of levels allocated to each primary color and hence to the number of drive lines allocated to each primary color.

Figure 8:
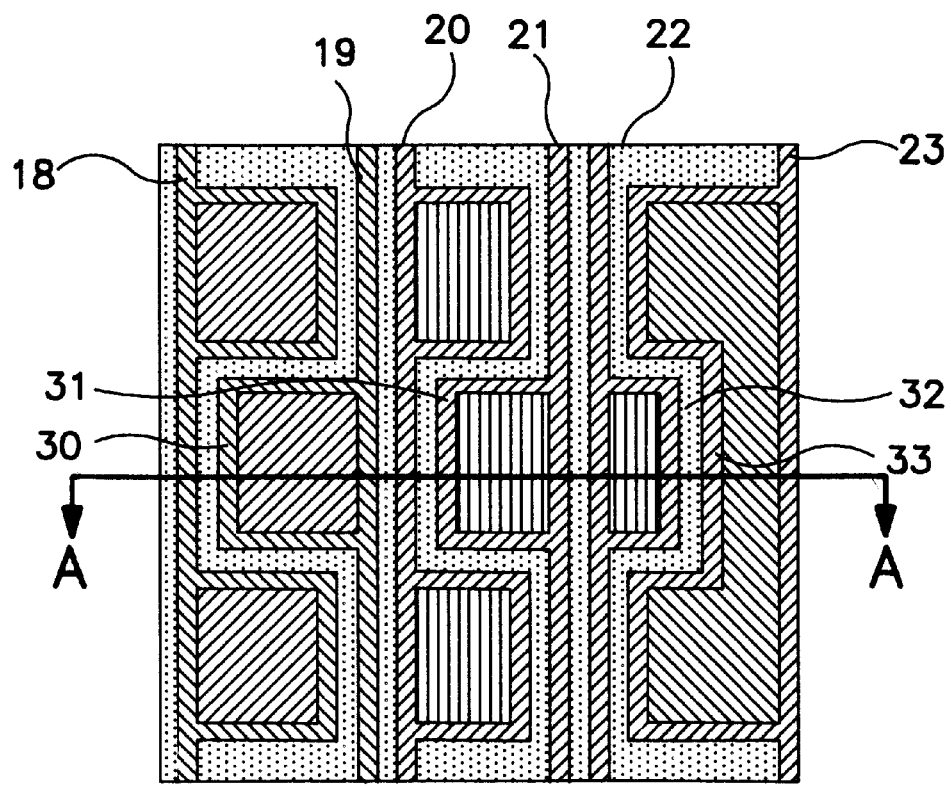
FIG. 8 is a plan view of the pixel configuration employing the preferred embodiment of the present invention.
Figure 9:
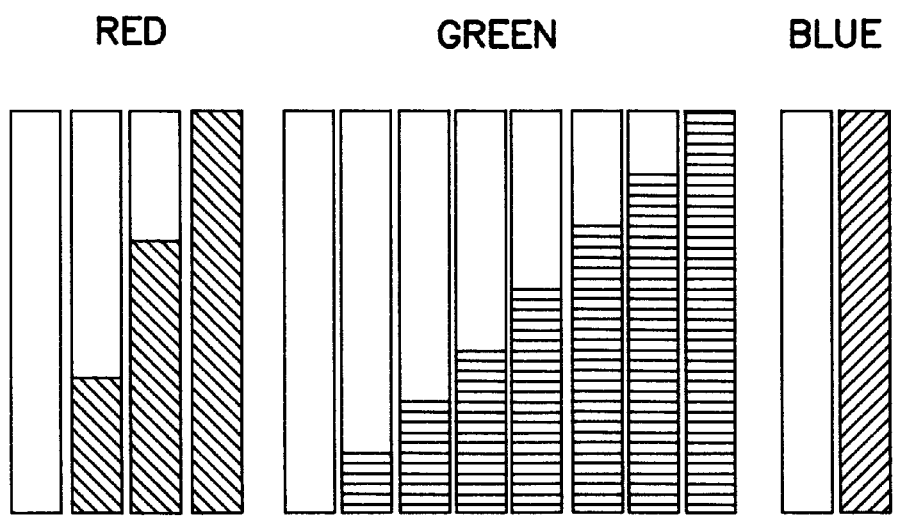
FIG. 9 illustrates the levels of the primary colors of the pixel configuration as shown in FIG. 8.

Referring now to FIG. 8, there is shown the preferred embodiment of the present invention for a pixel layout for a display having six drive lines, divided into two red drive lines 18, 19, three green drive lines 20, 21, 22 and one blue drive line 23. The pixel layout is suitable for utilisation with many different types of displays including FLCD displays.

The eye, being most sensitive to green, will pick up the error due to the discrete nature of the green sub-pixels more readily than the other two primary colours. For blue colours, the errors are less noticeable since the eye is not as sensitive to blue when compared to green or red. Therefore, in the present embodiment, more drive lines are devoted to green, a lesser number of drive lines are devoted to red, and even fewer drive lines are devoted to blue.

The green color, in the preferred embodiment has more subpixels and, as such, will have more discrete levels per pixel. This has the effect of reducing the threshold error for green. As seen before, FIG. 7 illustrates this concept where 16 is the maximum error. However, to increase the number of levels of green, the number of levels of blue were decreased thus the error for blue is increased. It has surprisingly been found that a decrease in the number of blue levels does not have a very significant effect on the overall appearance of the displayed image as the eye is not as sensitive to blue as it is to green.

In order to determine the number of address lines to be assigned to each primary color, a choice approximating the ratio of the eye's response to the individual colours can be made.

Alternatively, a more quantitative measure of assignment can be obtained by examining the luminance weighted threshold error and deriving a formula for halftoning distortion as a function of the distribution of bits between the different colors in a pixel.

In order to derive this formula, a number of assumptions have to be made. It is assumed that the distortion perceived by the eye which is due to halftoning of an image in one color is proportional to the variance about a mean intensity level that is displayed. It is further assumed that distortion perceived for a full colors image is the sum of perceived distortions from the three colors components of that image, and that the distortion in each color is independent of distortion in other colors. It is further assumed that different primary colors give different perceived distortion for the same intensity of distortion. The measure of quality for a pixel is assumed to be the average distortion over all color intensity combinations, with the assumption that all possible intensities occur with equal frequency.

From these assumptions, there can first be derived an average perceived distortion for a pixel:

$$\sigma^2_{perceived} = \text{average perceived distortion for a pixel} \quad \text{(EQ 1)}$$

$$= w^2_{red}\sigma^2_{av\,red} + w^2_{green}\sigma^2_{av\,green} + w^2_{blue}\sigma^2_{av\,blue}$$

where
   color=contribution of colour noise to perceived noise
   color=average perceived distortion in a single colour
      therefore:

$$\sigma^2_{perceived} = \int_{all\,intensities} \left( \frac{\left(\sum_{pixels}(\text{Intensity} - \text{Mean})^2\right)}{\text{number of pixels}} \right) \quad \text{(EQ 2)}$$

The weights $w_{colour}$ can be naively chosen as the contribution of each color to luminance or alternatively a description of the color-dependent low-pass characteristic of the eye can be used. The following luminance equation expresses the approximate weightings of the three color television primaries used in the National Television Systems Committee (NTSC) standard, which are necessary to produce one lumen of white light:

1 lm of white=0.30 lm of red+0.59 lm of green+0.11 lm of blue (EQ 3)

Note that these values are correct only for the NTSC primary chromaticities and a white point and, as a result, they are not exactly correct for most modern RGB monitors. As the variations in weightings for various modem RGB devices is likely to be small, the above mentioned weightings will be used in subsequent calculations.

The next step is to derive an expression for $\sigma^2$ as a function of pixel parameters.

Define $$B_{colour} = \text{number of bits devoted to the color} \quad \text{(EQ 4)}$$

Assuming the pixel contains binary weighted pixel subpotions each of which are separately illuminable, then the number of possible intensity levels which the pixel can display increases exponentially with the number of bits or drive lines, and the difference between adjacent possible intensity levels decreases exponentially with the number of bits. Therefore if $$L_{color} = \text{number of levels} = 2^B \quad \text{(EQ 5)}$$

and $$h_{colour} = \text{distance between levels} = \frac{1}{L_{colour} - 1} = \frac{1}{2^B - 1}$$

then $\sigma^2$ color is a function of the number of bits used for the color, thus it is more properly written as $\sigma^2_{color}(B_{color})$. Assuming the behaviour of the noise between adjacent colors of a multi-level pixel is the same as that for a single-level pixel, except for scaling by a factor $h_{colour}$ it is possible to write:

$$\sigma_{color}^2(B_{color}) = h_{color}^2(B_{color}) \cdot \sigma_{color}^2(1) \quad \text{(EQ 6)}$$

where $\sigma_{color}^2(1)$ is the average for all intensities of the halftoning noise for each intensity. ie:

$$\sigma_{color}^2(1) = \int_{I=0}^{1} \sigma_{color}^2(1, I) dI \quad \text{(EQ 7)}$$

The halftoning noise for a single intensity is $$\sigma_{color}^2(1, I) = \quad \text{(EQ 8)}$$
$$\sum (\text{frequency of intensity})(\text{intensity} - \text{mean intensity})^2$$

For intensity I, a reasonable halftoning algorithm should turn on the pixel with frequency I, and turn off the pixel with frequency (1−I). Assuming that this is the case, the mean intensity will be I, so therefore.

$$\sigma_{color\ I}^2(1, I) = I(1 - I)^2 + (1 - I)(0 - I)^2 \quad \text{(EQ 9)}$$
$$= I(1 - I)$$

Substituting Equation 9 into Equation 7 yields $$\sigma_{color}^2(1) = \int_{I=0}^{1} I(1 - I) dI \quad \text{(EQ 10)}$$

$$= \frac{1}{6}$$

Substituting Equation 10 and Equation 5 into Equation 6 yields $$\sigma_{color}^2(B_{color}) = \frac{1}{6} \frac{1}{(2^{B_{colour}} - 1)^2} \quad \text{(EQ 11)}$$

Finally, substituting Equation 11 into Equation 1 yields the final result $$\sigma_{perceived}^2 = \frac{1}{6}\left(\frac{w_{red}^2}{(2^{B_{red}} - 1)^2} + \frac{w_{green}^2}{(2^{B_{green}} - 1)^2} + \frac{w_{blue}^2}{(2^{B_{blue}} - 1)^2}\right) \quad \text{(EQ 12)}$$

A pixel binary weighted arrangement as shown in FIG. 4 has equal weightings for red, green and blue, with each color having two subpixels. Substituting $B_{color}=2$ and the weightings mentioned earlier into Equation 10, the result is that:

$$\sigma_{perceived}^2 = 0.00834. \quad \text{(EQ 13)}$$

For the preferred embodiment each primary color has a different number of subpixels, with $B_{red}=2$, $B_{green}=3$, and $B_{blue}=1$ the weightings stay the same. Substituting in the result obtained is:

$$\sigma_{perceived}^2 = 0.00487. \quad \text{(EQ 14)}$$

which results in a reduction in the average perceived distortion for the pixel.

As is known to those skilled in the art, the construction of discrete level displays such as a display utilizing a chiral smectic liquid crystal or a FLCD display can take many different forms depending on the manufacturing technologies used.

Figure 10:
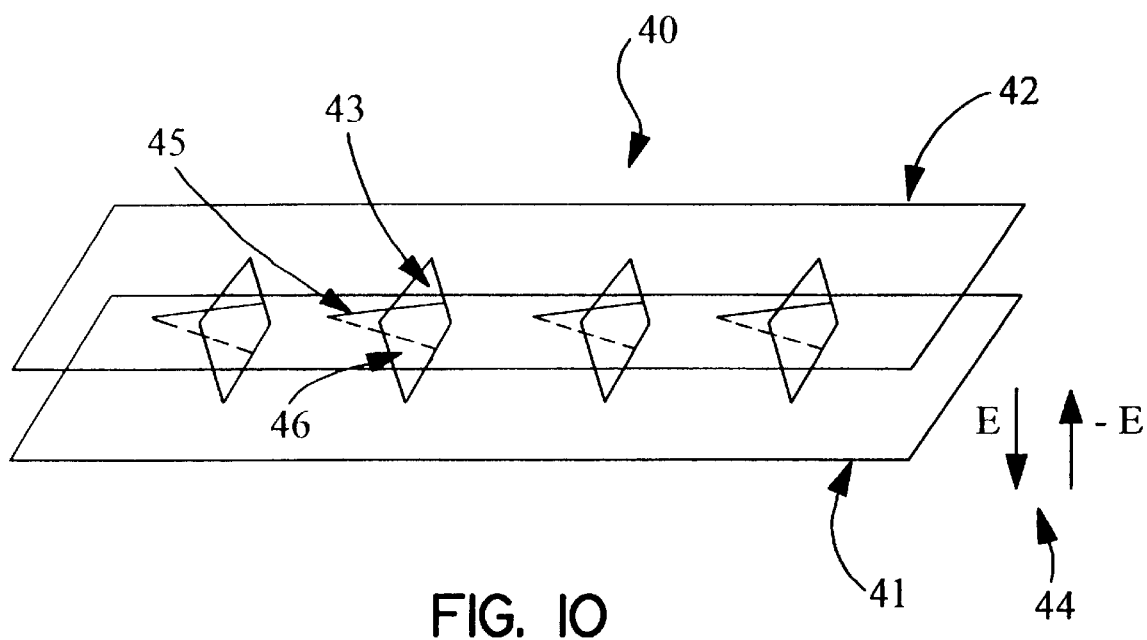
FIG. 10 illustrates the basic operation of a ferro-electric liquid crystal display device.

Referring now to FIG. 10, there is illustrated the basic operation of a ferro-electric liquid crystal display device (FLCD) 40 which comprises a pair of electrode plates 41, 42, normally comprising glass substrates coated with a transparent form of electrodes, associated electrical supply rails and color filters. A layer of liquid crystal having molecular layers 43 is disposed between and perpendicular or approximately perpendicular to the electrode plates. The liquid crystal assumes a chiral smectic C phase or an H phase and is disposed in a thickness thin enough (eg: 0.5–5 microns) to release the helical structure inherent to the chiral smectic phase When an electric field E (or −E) 44 exceeding a certain threshold is applied between the upper and lower substrates 41, 42 liquid crystal molecules 43 are oriented in accordance with the electric field. A liquid crystal molecule has an elongated shape and shows a refractive anisotropy between the long axis and the short axis. Therefore if the ferro-electric liquid crystal device 40 is sandwiched between a pair of crossed polarizers (not shown) mounted on the glass substrates 41, 42, there will be provided a liquid crystal light modulation device.

When an electric field 44 exceeding a certain threshold is applied, the liquid crystal molecules 43 are oriented to a first polarization orientation state 45. Further, when a reverse electric field (−E) is applied, the liquid crystal molecules 43 are oriented to a second polarization orientation state 46. These orientation states are further retained as long as the electric field which is applied, does not exceed a certain threshold in the reverse direction.

The manufacturing processes utilised in the display construction are very similar to those used in the construction or fabrication of Very Large Scale Integrated Circuit Devices (VLSI) and familiarity with the constructions of such devices is assumed.

Figure 11:
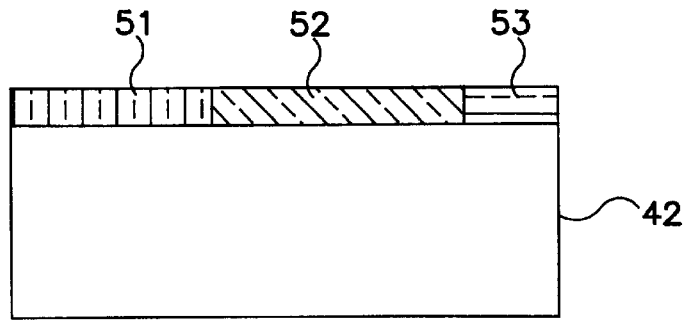
FIG. 11 is a cross section taken through the line A—A of FIG. 8.

The construction of a FLCD display begins with the two glass substrates. Referring initially to FIG. 11, an example of the construction of the top glass substrate 42 will now be described.

Color Filters

After the surface of the substrate 42 has been thoroughly cleaned, an aluminium chelate coupling agent (not shown) can be applied to ensure the proper adhesion to the glass of subsequent layers to the glass substrate.

A spin coating process is then used to apply a 1.5 $\mu$m layer of photosensitive polyamide containing a primary color die, which in the first case will be red. To remove residual solvents, the polyamide is pre-baked for approximately 10 minutes at 80° C. The photosensitive polyamide is then exposed using a pixel mask corresponding to the area of the red color filter 51 to be exposed. The polyamide layer is then developed leaving the red color filter portions 51 of each pixel on the substrate 42. This first color filter portion 51 is then post baked to form a stable structure before the process is repeated for the green filter 52 and blue filter 53. Importantly, the green filter 52 is of a larger magnitude than the blue filter 53 as is in accordance with the cross section of FIG. 11 which is taken through the line A—A in FIG. 8. Optionally, a shielding member, such as opaque metal member (not shown) may be disposed between neighboring color filter portions in order to shield light passing therethrough.

Data Level Metal Layer

Figure 12:
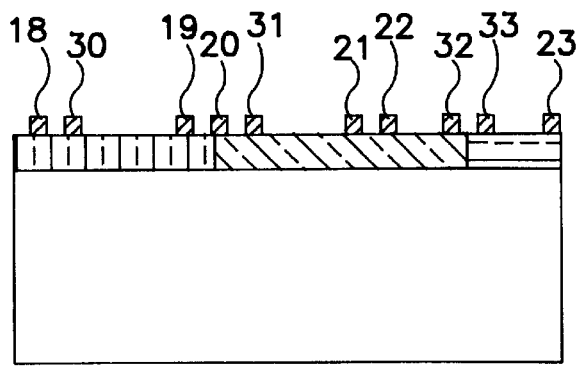
FIG. 12 is a cross section, similar to FIG. 11, but illustrating the construction of the data metal layer of a pixel.

Referring now to FIG. 12 the next portion of the display device constructed is preferably the data level metal layer including drive lines 18–23 and encircling portions 30–33. The deposition of this metal layer occurs directly over the color filters.

In the construction of devices using metal layers, the use of Molybdenum (Mo) has been preferred for the formation of the relevant circuitry. Molybdenum is preferred due to its superior patterning properties and planarization properties.

Aluminum is also a possible candidate for use in patterning of the metal layer. The resistivity of aluminum is 0.027 $\mu\Omega$m at 25° C., whereas the resistivity of molybdenum is 0.0547 $\mu\Omega$m at 25° C. Hence a metal conductive layer made of aluminum is almost twice as conductive as one made of molybdenum. However, hillock or spike formation in aluminum, as a result of stress release during differential thermal expansion of aluminum in comparison with other substances used in the creation of the display, creates a serious problem with prior forms of displays which currently prevents the use of aluminum.

The deposition of a metal layer is well known to those skilled in the art of semiconductor circuit fabrication and an example process for such deposition will now be described.

Figure 13:
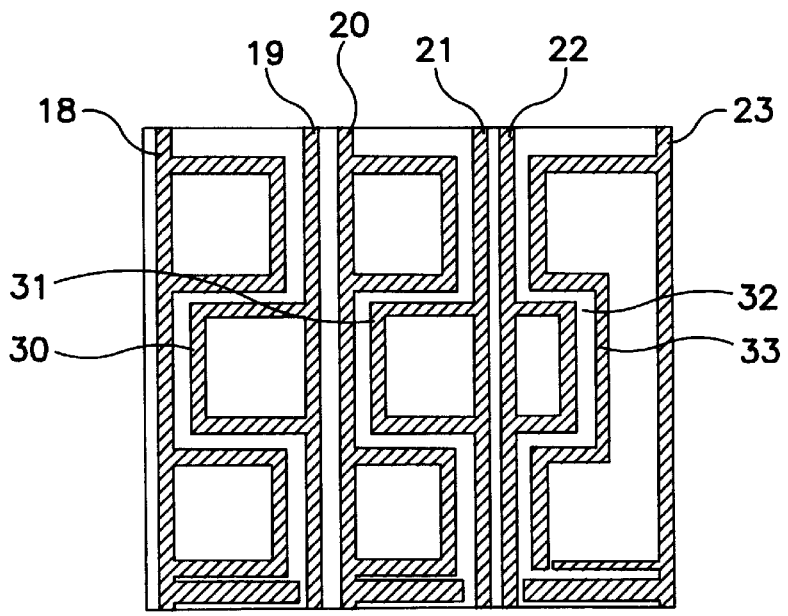
FIG. 13 illustrates the data metal mask utilized in construction of the data metal layer of FIG. 12.

0.3 $\mu$m layer of a Aluminum and 0.5% Copper (AlCu) alloy is first sputtered onto the surface of the substrate. Preferably the aluminum is planarised to a 0.09 $\mu$m surface height difference. The sputtered aluminum layer is then primed for photoresist adhesion by spin coating a monolayer of hexamethyldisilazane (HMDS). A 1 $\mu$m layer of positive photoresist such as AZ1370 is then spin coated on top of the priming layer. The photoresist is then pre-baked for 3 minutes at 90° C. using an infra-red oven. The photoresist is then exposed using the pixel mask shown in FIG. 13, which comprises simple vertical stripes 18–23 corresponding to the various areas of the data metal layer and encircling portions cg. 30–33. The photoresist is exposed to the metal mask at 35 mJ/cm$^2$.

The photoresist can then be developed for 50 seconds at 23° C. in 25% aqueous solution AZ-351 and 40% aqueous solution AZ-311. A development inspection can then take place before the resist is stripped and any out of tolerance panels are either discarded or reworked. The photoresist can then be post-baked at 150° C. before the sputtered aluminum is wet etched in an agitated solution of 80% phosphoric acid, 5% nitric acid, 5% acetic acid and 10% water at 40° C. for 2 minutes.

Finally the remaining photoresist is stripped using a low phenol organic stripper such as Shiplev remover "1112A". leaving the data level metal layer on the bottom substrate 42.

Data Level Transparent Electrode Layer

Figure 14:
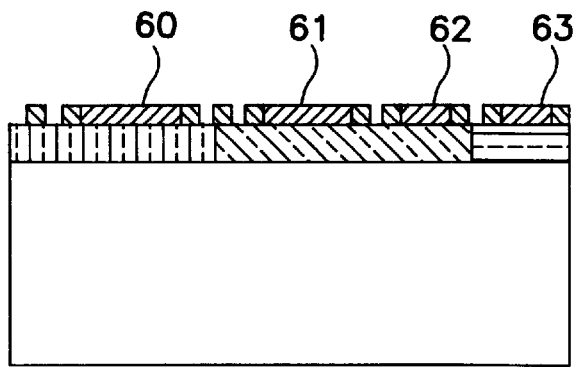
FIG. 14 is a cross section, illustrating the construction of the data level transparent layer of the preferred embodiment.

Referring now to FIG. 14, the next layer deposited is the data level transparent electrode layer including portions 60–63. with portion 60 forming a red transparent electrode, portions 61, 62 forming binary weighted green transparent electrodes, and portion 63 forming a blue transparent electrode.

This layer is formed by applying a transparent electrode such as ITO (Indium Tin Oxide) on the substrate 42.

The process of formation of the data level dielectric layer includes the sputtering of indium and tin in an oxygenated atmosphere to initially form a 0.07$\mu$m layer of ITO. This layer of ITO is then primed, again by spin coating a monolayer of HMDS. On top of this layer is spin coated a 1 $\mu$m layer of positive photoresist such as AZ1370. The photoresist can then be pre-baked, to remove solvents, for approximately 3 minutes at 90° C. using an infra-red oven.

Figure 15:
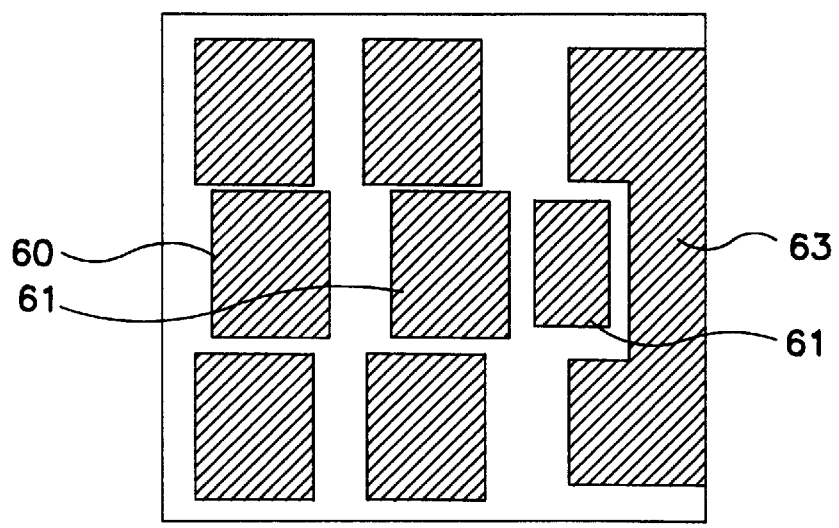
FIG. 15 illustrates the pixel mask utilizing the construction of the transparent layer of FIG. 14.

The photoresist is then exposed to the data level electrode mask 65 as shown in FIG. 15 at an energy of approximately 35 mJ/cm$^2$. The photoresist is developed for 50 seconds at 23° C. in a 25% aqueous solution AZ-351 and a 40% aqueous solution AZ311. The photoresist is then post baked at 120° C. The ITO is then wet etched and the remaining photoresist is stripped using a low phenol organic stripper such as Shipley 'Remover 1112A' leaving the data transparent electrode layer connected to the data metal layer.

Figure 16:
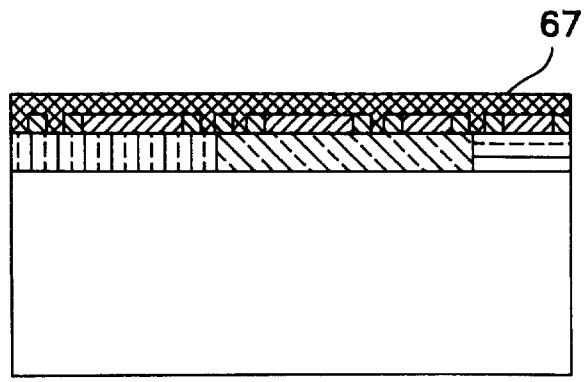
FIG. 16 is a cross section illustrating the construction of a surface layer of the top substrate.

Referring now to FIG. 16, the final step in the construction of the top substrate is to apply a surface layer 67. The surface layer includes the sputtering of 0.1 $\mu$m of a tantalum pentoxide insulator, the application of 0.1 $\mu$m of silicon titanium oxide, the spin coating of 0.02 $\mu$m of polyamide which is then post baked and the surface subjected to uniaxial alignment treatment such as rubbing for the proper liquid crystal molecule alignment.

The second substrate 41 (FIG. 10) is laid out substantially in the same manner as the first substrate but for different masks being used.

Figure 17:
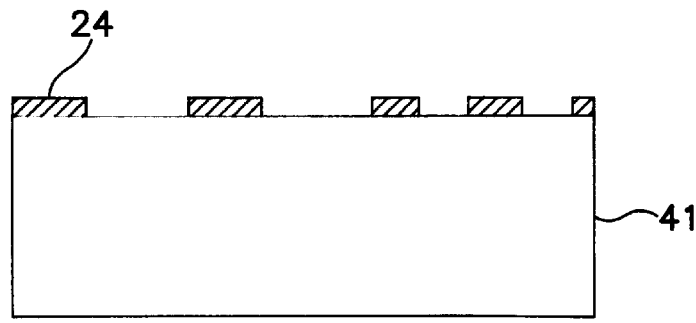
FIG. 17 is a cross section illustrating the formation of the common level metal layer on a bottom substrate.
Figure 18:
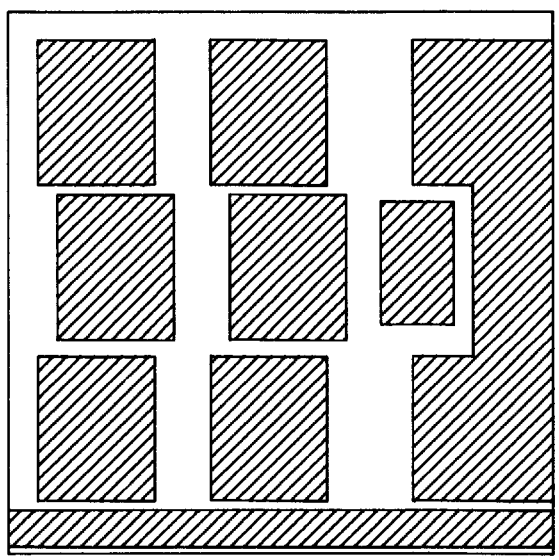
FIG. 18 illustrates the pixel mask utilized in the construction of the common metal layer of FIG. 17.

Referring now to FIG. 17, the common level metal layer 24 is formed first on the bottom substrate 41 utilising the same techniques as those discussed in relation to the data level metal layer of FIG. 12. The pixel mask utilized in the construction of common metal layer 24 is as shown in FIG. 18.

Figure 19:
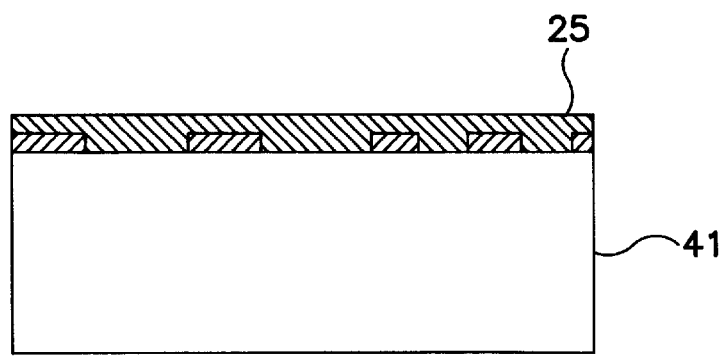
FIG. 19 is a cross section illustrating the construction of the common level transparent layer on the bottom substrate.
Figure 20:
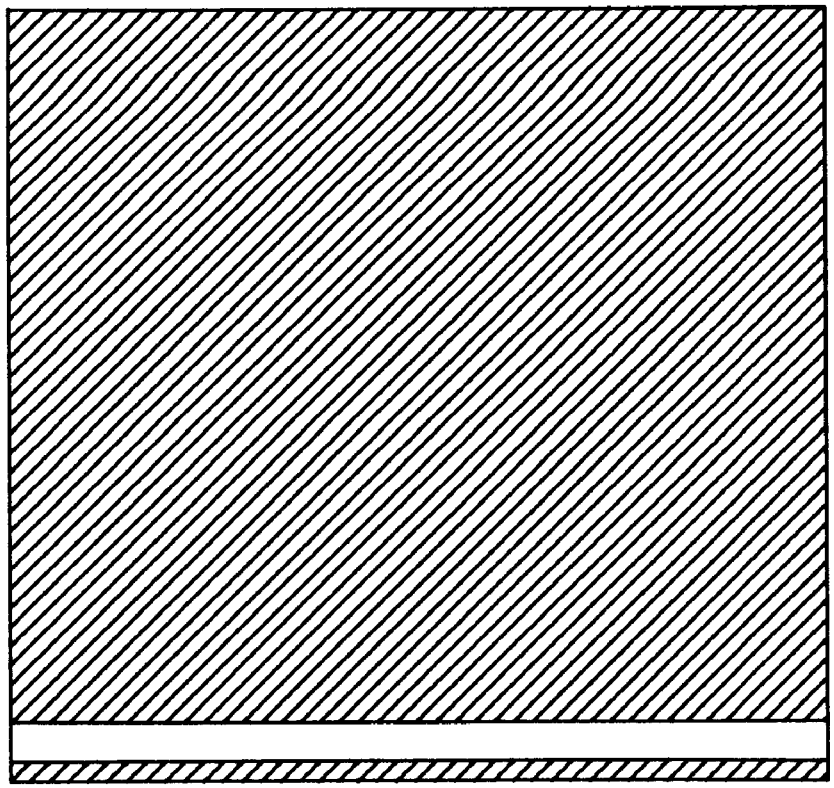
FIG. 20 illustrates the pixel mask utilized in construction of the common level transparent layer of FIG. 19.
Figure 21:
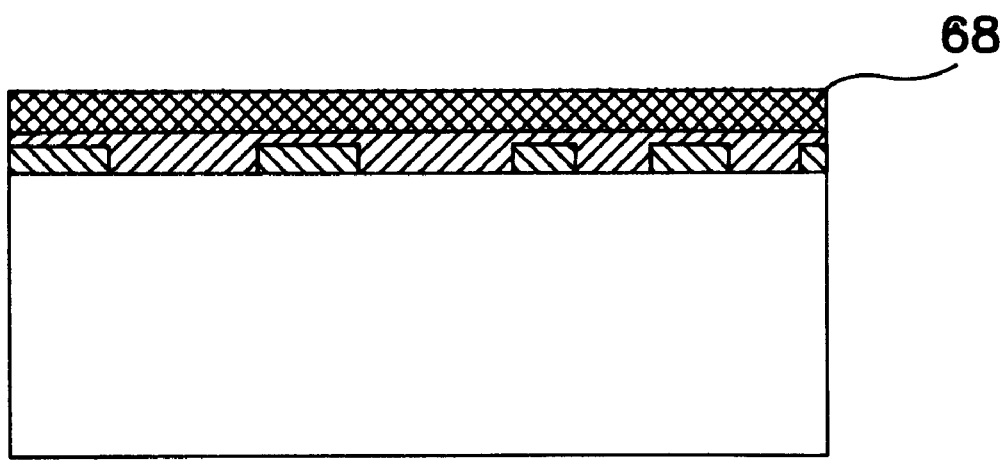
FIG. 21 is a cross section illustrating the formation of the common level surface layer on the bottom substrate.

Turning now to FIG. 19, the next step in the construction of the bottom substrate 41 is the common level transparent layer 25 comprising indium tin oxide (ITO) or the like, laid down in accordance with the procedure outlined above with reference to FIG. 12. The mask utilized in forming the common level transparent layer 25 is as shown in FIG. 20. Finally, with reference to FIG. 21, a common level surface layer 68 is formed on the common substrate using the techniques outlined above with reference to FIG. 16.

Figure 22:
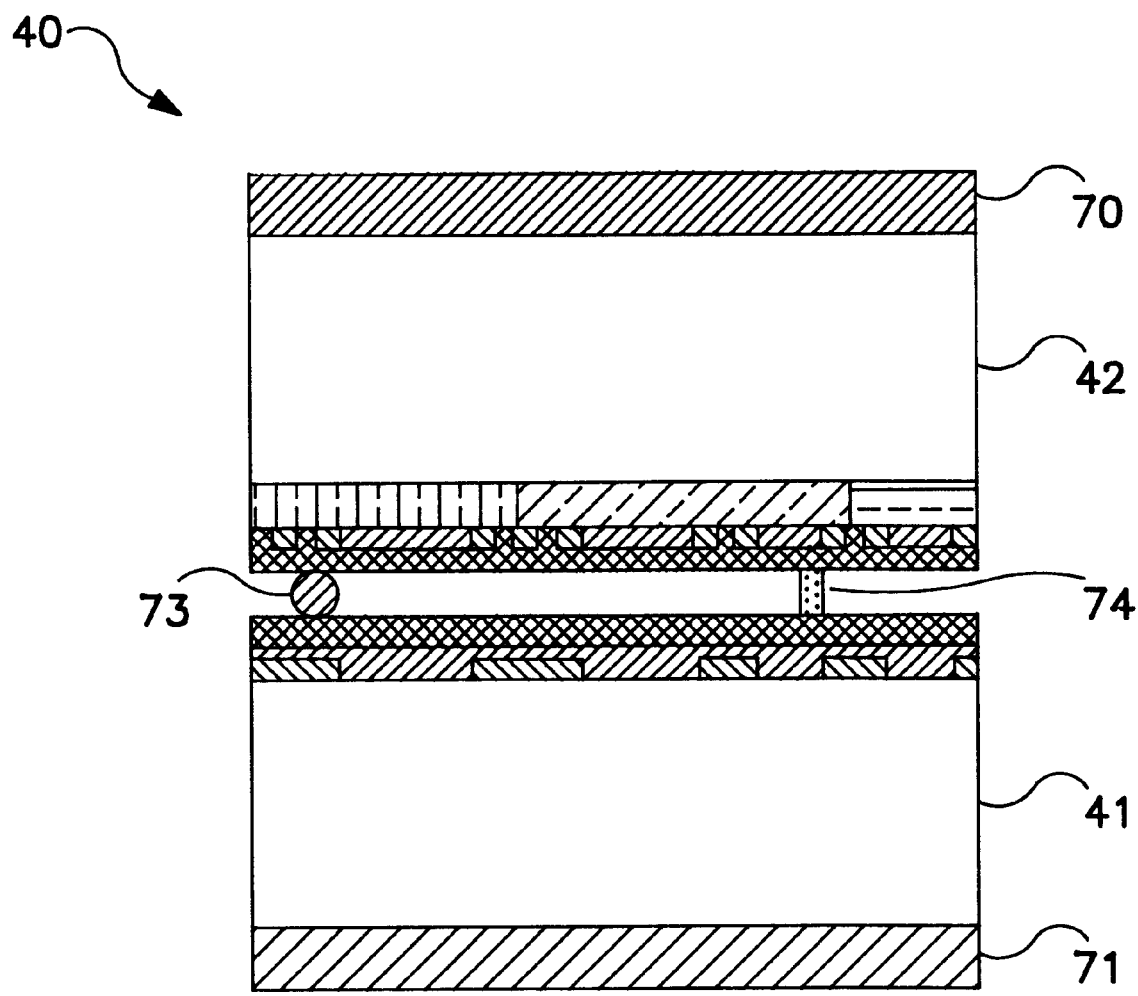
FIG. 22 is a cross section of a pixel of a display taken through the line A—A of FIG. 8.

Referring now to FIG. 22, there is shown the final form of construction of the display device 40, which includes the top substrate 42 and bottom substrate 41 each of which has its surface covered with a polarizing sheet 70, 71, which, depending on the desired driving requirement, may have their polarizing axes at right angles to or parallel to each other. The two substrates 41, 42 are kept apart in a stable equilibrium by 1.5 μm glass spheres 73 which are sprayed on at a density of approximately 100 spheres per square millimeter. The substrates are further held together by adhesive drops 74. The adhesive droplets 74 and spheres 73 act to maintain the display panel 40 in a static equilibrium with the thickness of the layer between the two substrates 41, 42 being of the order of 1.5 μm, being a diameter of the spheres 73. The liquid crystal (not shown) is placed between the two substrates so as to form a ferro-electric liquid crystal device.

Figure 23:
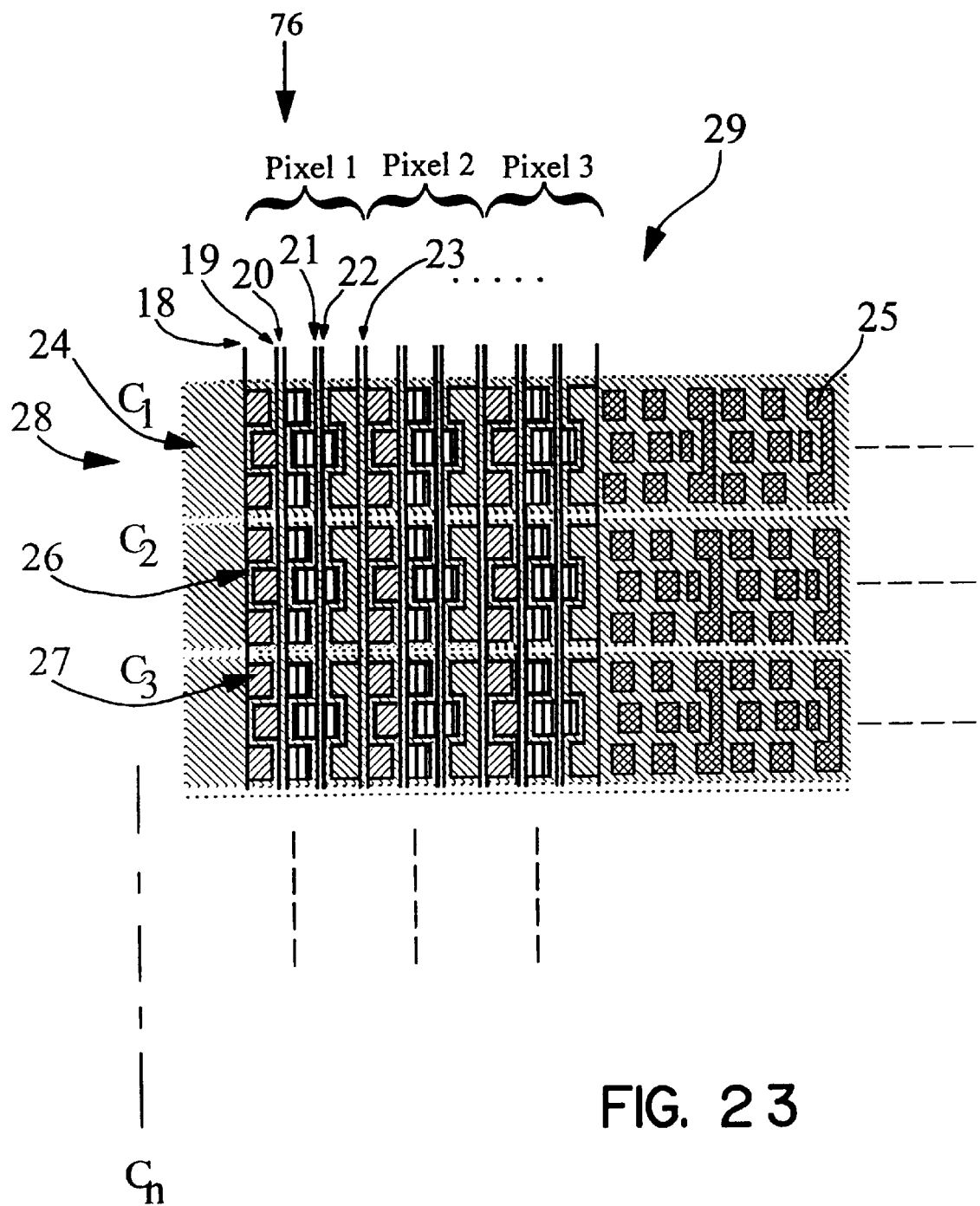
FIG. 23 illustrates, partly in section, the layout of a number of pixels of a liquid crystal type display, in accordance with the preferred embodiment.

Referring now to FIG. 23, there is shown, for illustrative purposes, a sectional plan view of the overlay between the common layer, comprising common metal layer 24 and common transparent layer 25. A data level layer, comprising data metal layer 26 and data transparent layer 27 is also shown. Each column of pixels eg. 76 includes four associated drive lines, and the first drive line 18 being utilized to drive a four unit area red electrode, the second drive line 19 is utilized to drive a two unit area red electrode area. The drive line 20 is utilized to drive a four unit area green electrode, the drive unit 21 drives a two unit area green electrode, and the drive unit 22 drives a one unit area green electrode. Finally, drive line 23 is utilized to drive a eight unit blue electrode area. The common electrodes are formed in rows and a pixel is addressed in the normal manner.

The above embodiment has been set out in relation to a pixel having six drive lines and associated transparent areas. It would be obvious to those skilled in the art to apply the principle of distribution of subpixels based on the weighted response on the eye to different combinations of drive lines and transparent electrode areas.

Additionally, the foregoing describes only one embodiment of the present invention utilizing ferro-electric liquid crystal devices having particular restrictions placed thereon. It would be obvious to those skilled in the art to apply the present invention to other forms of liquid crystal displays and, indeed to other forms of discrete level displays. For example, the present invention can be readily applied to plasma displays and displays using other forms of primary color systems. Further, the present invention is in no way restricted to the utilization of binary weighted transparent electrode elements

What I claim is:

1. A method for determining a number of drive lines allocated to each primary color of a discrete level color display, the display having a plurality of pixels, each formed from a plurality of independently illuminable areas, and each of which is assigned to a red (R), green (G) or blue (B) primary color component, said method comprising at least the step of allocating the drive lines to the primary color components such that, for each pixel a number of discrete intensity levels for the G component exceeds a number of discrete intensity levels for the R component, and the number of discrete intensity levels for the R component exceeds a number of discrete intensity levels for the B component.

2. A color display apparatus having a first plurality of independently illuminable areas connected to a second plurality of data drive lines, each of said illuminable areas being assigned to a red (R), green (G) or blue (B) primary color component, wherein, for each pixel, said data drive lines are allocated to said primary color components such that a number of discrete intensity levels for the G component of the color display apparatus exceeds a number of discrete intensity levels for the R component, and the number of discrete intensity levels for the R component exceeds a number of discrete intensity levels for the B component.

3. A method as claimed in claim 1, wherein the number of illuminable areas corresponding to each color component is distinct from the number of illuminable areas of at least one of the other color components.

4. A color display as claimed in claim 2, wherein the number of illuminable areas of each color component is different from the number of illuminable areas of at least one of the other color components.

5. A method for determining a number of drive lines allocated to each primary color of a discrete level color display, the display having a plurality of pixels, each pixel having a plurality of independently illuminable areas, each area being assigned to one of a plurality of primary color components selected from among red (R), green (G) and blue (B), each of the primary color components having a corresponding average human eye response function, said method comprising, for each of the pixels, at least the step of allocating the drive lines to the primary colors substantially in a logarithmic manner related to the corresponding average human eye response functions.

6. A method as claimed in claim 3, wherein the number of the illuminable areas for each of the primary color components is different.

7. A method as claimed in claim 5, wherein the display is a discrete level ferro-electric liquid crystal display.

8. A method as claimed in claim 5, wherein the illuminable areas of each primary color component are substantially binary weighted.

9. A method as claimed in claim 5, wherein the number of independently illuminable red areas is two, the number of independently illuminable green areas is three and the number of independently illuminable blue areas is one.

10. A method as claimed in claim 5, wherein the number of red drive lines is two, the number of green drive lines is three and the number of blue drive lines is one.

11. A color display apparatus having a first plurality of independently illuminable areas connected to a second plurality of data drive lines, each of the independently illuminable areas being assigned to a red (R), green (G) or blue (B) primary color component, wherein each of said primary color components has a corresponding average human eye response function, and said data drive lines are allocated to said primary color components substantially in a logarithmic manner related to the corresponding average human eye response function.

12. A color display apparatus as claimed in claim 4, wherein the number of said illuminable areas for each of said primary color components is different.

13. A color display apparatus as claimed in claim 11, wherein the number of red drive lines is two, the number of green drive lines is three and the number of blue drive lines is one.

14. A method for determining the number of drive lines allocated to each primary color of a discrete level color display, the display having a plurality of pixels, each pixel having a plurality of independently illuminable areas, each area being assigned to one of a plurality of primary color components included in the group of red, green and blue, said method comprising at least the step of allocating the drive lines to the primary color components in a ratio such that a condition of the illuminable areas to one color component is different from that of the illuminable areas to the other color component, wherein each primary color component has a corresponding average human eye response function, and said allocating step further comprises allocating the drive lines to the primary colors in a ratio substantially in accordance with a logarithmic ratio of the corresponding average human eye response functions, wherein the primary color components are red, green and blue and the number of red drive lines is two, the number of green drive lines is three and the number of blue drive lines is one.

15. A color display apparatus according to claim 11, wherein the number of read drive line is two, the number of green drive lines is three and the number of blue drive lines is one.

* * * * *

UNITED STATES PATENT AND TRADEMARK OFFICE
CERTIFICATE OF CORRECTION

PATENT NO. : 6,008,868
DATED : December 28, 1999
INVENTOR(S) : KIA SILVERBROOK

It is certified that error appears in the above-identified patent and that said Letters Patent is hereby corrected as shown below:

ON TITLE PAGE AT [57] ABSTRACT

Line 4, "utilising" should read --utilizing--.

COLUMN 1

Line 56, "centre" should read --center--;
   Line 63, "pixel" should read --the pixels--;
   Line 66, "color" should read --colors--.

COLUMN 2

Line 51, "area," should read --areas,--.

COLUMN 5

Line 48, "Three." should read --three.--.

COLUMN 6

Line 31, "colors" should read --color--;
   Line 32, "colors" should read --color--;
   Line 49, "colour" should read --color--;
   Line 50, "colour" should read --color--;
   Line 58, "$W_{colour}$" should read --$W_{color}$--;
   Line 67, "[illegible]3)" should read --blue (EQ3)--.

UNITED STATES PATENT AND TRADEMARK OFFICE
CERTIFICATE OF CORRECTION

PATENT NO. : 6,008,868
DATED : December 28, 1999
INVENTOR(S) : KIA SILVERBROOK

It is certified that error appears in the above-identified patent and that said Letters Patent is hereby corrected as shown below:

COLUMN 7

Line 7, "$\sigma^2_{colour}$" should read --$\sigma^2_{color}$--;
Line 12, "$B_{colour}$" should read --$B_{color}$--;
Line 26, "$h_{colour}$" should read --$h_{color}$--;
Line 27, "$L_{colour}$" should read --$L_{color}$--;

Line 29, "$\sigma^2 color$" should read --$\sigma^2_{color}$--;
Line 33, "$h_{colour}$" should read --$h_{color}$--.

COLUMN 8

Line 10, "$(2^{Bcolour}$" should read --$(2^{Bcolor}$--.

COLUMN 9

Line 17, "die," should read --dye,--;
Line 43, "Molybdenum" should read --molybdenum--;
Line 60, "Aluminum and 0.5% Copper" should read
    --aluminum and 0.5% copper--;
Line 62, "planarised" should read --planarized--.

COLUMN 10

Line 2, "infra-red" should read --infrared--;
Line 18, "Shiplev" should read --Shipley--;
Line 38, "infra-red" should read --infrared--;
Line 60, "utilising" should read --utilizing--.

UNITED STATES PATENT AND TRADEMARK OFFICE
CERTIFICATE OF CORRECTION

PATENT NO.   : 6,008,868
DATED        : December 28, 1999
INVENTOR(S)  : KIA SILVERBROOK It is certified that error appears in the above-identified patent and that said Letters Patent is hereby corrected as shown below:

<u>COLUMN 14</u>

Line 7, "read drive line" should read --red drive lines--.

Signed and Sealed this

Twenty-seventh Day of March, 2001

*Attest:*

NICHOLAS P. GODICI

*Attesting Officer*   *Acting Director of the United States Patent and Trademark Office*